United States Patent
Chatterjee et al.

(10) Patent No.: US 7,908,448 B1
(45) Date of Patent: Mar. 15, 2011

(54) MAINTAINING DATA CONSISTENCY IN MIRRORED CLUSTER STORAGE SYSTEMS WITH WRITE-BACK CACHE

(75) Inventors: Paresh Chatterjee, Fremont, CA (US); Narayanan Balakrishnan, Milpitas, CA (US); Raja Jayaraman, Fremont, CA (US)

(73) Assignee: American Megatrends, Inc., Norcross, GA (US)

( * ) Notice: Subject to any disclaimer, the term of this patent is extended or adjusted under 35 U.S.C. 154(b) by 546 days.

(21) Appl. No.: 12/013,116

(22) Filed: Jan. 11, 2008

Related U.S. Application Data

(60) Provisional application No. 60/898,444, filed on Jan. 30, 2007.

(51) Int. Cl.
- G06F 13/00 (2006.01)
- G06F 13/28 (2006.01)
- G06F 7/00 (2006.01)
- G06F 17/00 (2006.01)

(52) U.S. Cl. ............. 711/162; 711/135; 711/E12.103; 707/655

(58) Field of Classification Search ............. 711/162, 711/135, E12.103; 707/655
See application file for complete search history.

(56) References Cited

U.S. PATENT DOCUMENTS

| | | | |
|---|---|---|---|
| 4,849,978 A | 7/1989 | Dishon et al. | |
| 4,942,579 A | 7/1990 | Goodlander et al. | |
| 5,257,367 A | 10/1993 | Gooddlander et al. | |
| 5,524,204 A | 6/1996 | Verdoorn, Jr. | |
| 5,678,061 A | 10/1997 | Mourad | |
| 5,720,027 A | 2/1998 | Sarkozy et al. | |
| 5,732,238 A | 3/1998 | Sarkozy | |
| 5,787,459 A | 7/1998 | Stallmo et al. | |
| 5,790,774 A | 8/1998 | Sarkozy | |
| 5,893,919 A | 4/1999 | Sarkozy et al. | |
| 5,907,849 A | 5/1999 | Dias et al. | |
| 6,098,128 A | 8/2000 | Velez-McCaskey et al. | |
| 6,105,122 A | 8/2000 | Muller et al. | |
| 6,108,748 A | 8/2000 | Ofek et al. | |
| 6,128,654 A | 10/2000 | Runaldue et al. | |
| 6,173,377 B1 * | 1/2001 | Yanai et al. | 711/162 |
| 6,282,619 B1 | 8/2001 | Islam et al. | |
| 6,289,398 B1 | 9/2001 | Stallmo et al. | |
| 6,502,166 B1 | 12/2002 | Cassidy | |

(Continued)

OTHER PUBLICATIONS

U.S. Appl. No. 12/492,509, filed Jun. 26, 2009 entitled "Achieving Data Consistency in a Node Failover with a Degraded RAID Array", Inventors: Chatterjee et al.

(Continued)

*Primary Examiner* — Matt Kim
*Assistant Examiner* — Edward J Dudek, Jr.
(74) *Attorney, Agent, or Firm* — Aaronson & Waldman, LLC

(57) ABSTRACT

Techniques for maintaining mirrored storage cluster data consistency on systems with write back cache can employ write-intent logging and periodic log clearing. The techniques can track any outstanding I/Os, data in caches, and data that has gone out of sync between mirrored nodes due to link failures. The techniques can ensure that a power failure on any of the storage nodes does not result in inconsistent data among the storage nodes. The techniques can use gate bitmaps to log outstanding I/Os. The gate bitmaps may be periodically cleared. The clearing period may be selected as to allow enough time for all caches to be flushed and for all synchronizing I/Os to complete. Efficient queuing of I/O requests in conjunction with the efficient operation of multiple gate bitmaps can reduce performance impacts of the gating or logging operations.

16 Claims, 8 Drawing Sheets

U.S. PATENT DOCUMENTS

| | | | |
|---|---|---|---|
| 6,671,705 B1 * | 12/2003 | Duprey et al. | 1/1 |
| 6,826,711 B2 | 11/2004 | Moulton et al. | |
| 7,069,385 B2 | 6/2006 | Fujimoto et al. | |
| 7,089,448 B2 | 8/2006 | Hinshaw et al. | |
| 7,155,466 B2 | 12/2006 | Rodriguez et al. | |
| 7,159,150 B2 | 1/2007 | Kenchammana-Hosekote et al. | |
| 7,231,493 B2 | 6/2007 | Nguyen et al. | |
| 7,315,958 B1 | 1/2008 | Bridge, Jr. | |
| 2002/0059540 A1 | 5/2002 | Mann et al. | |
| 2003/0088803 A1 | 5/2003 | Arnott et al. | |
| 2003/0105923 A1 | 6/2003 | Bak et al. | |
| 2003/0221063 A1 | 11/2003 | Eguchi et al. | |
| 2004/0044865 A1 * | 3/2004 | Sicola et al. | 711/162 |
| 2004/0073831 A1 | 4/2004 | Yanai et al. | |
| 2004/0088483 A1 | 5/2004 | Chatterjee et al. | |
| 2004/0250031 A1 | 12/2004 | Ji et al. | |
| 2004/0255189 A1 | 12/2004 | Chu et al. | |
| 2005/0091391 A1 | 4/2005 | Burton et al. | |
| 2005/0102551 A1 | 5/2005 | Watanabe | |
| 2005/0114350 A1 | 5/2005 | Rose et al. | |
| 2005/0273565 A1 | 12/2005 | Hirakawa et al. | |

OTHER PUBLICATIONS

U.S. Official Action dated Oct. 5, 2009 in U.S. Appl. No. 11/551,291.
U.S. Official Action dated Aug. 17, 2009 in U.S. Appl. No. 11/551,303.
U.S. Official Action dated Jul. 8, 2009 in U.S. Appl. No. 11/551,311.
U.S. Official Action dated Dec. 28, 2009 in U.S. Appl. No. 11/551,311.
U.S. Official Action dated Oct. 14, 2009 in U.S. Appl. No. 11/695,854.
U.S. Official Action dated Dec. 23, 2008 in U.S. Appl. No. 11/551,311.
U.S. Official Action dated Mar. 16, 2009 in U.S. Appl. No. 11/551,303.
U.S. Appl. No. 11/551,291, filed Oct. 20, 2006, entitled "Providing Redundancy in a Storage System," Inventors: Chatterjee et al.
U.S. Appl. No. 11/551,303, filed Oct. 20, 2006, entitled "Background Movement of Data Between Nodes in a Storage Cluster," Inventors: Chatterjee et al.
U.S. Appl. No. 11/551,311, filed Oct. 20, 2006, entitled "Distributed Hot-Spare Storage in a Storage Cluster," Inventors: Chatterjee et al.
U.S. Appl. No. 11/695,854, filed Apr. 3, 2007, entitled "Asynchronous Data Replication", Inventors: Chatterjee et al.
U.S. Appl. No. 12/013,110, filed Jan. 11, 2008, entitled "Maintaining Data Consistency in Mirrored Cluster Storage Systems Using Bitmap Write-Intent Logging," Inventors: Chatterjee et al.
U.S. Official Action dated Mar. 20, 2009 in U.S. Appl. No. 11/551,291.
U.S. Official Action dated Apr. 30, 2009 in U.S. Appl. No. 11/695,854.
U.S. Official Action dated Jul. 28, 2008 in U.S. Appl. No. 11/551,303.
U.S. Official Action dated Jul. 9, 2010 in U.S. Appl. No. 12/013,110.
U.S. Official Action dated Jul. 22, 2010 in U.S. Appl. No. 11/551,311.

* cited by examiner

MAINTAINING DATA CONSISTENCY IN MIRRORED CLUSTER STORAGE SYSTEMS WITH WRITE-BACK CACHE

CROSS-REFERENCE TO RELATED APPLICATIONS

This application claims the benefit of U.S. provisional patent application No. 60/898,444, filed on Jan. 30, 2007, and entitled "Novel Method of Maintaining Data Consistency in Mirrored Cluster Storage Systems across Power Failures using Bitmap Write-Intent Logging and Delayed, Periodic Clearing to Protect Underlying Write-Back Caches" which is expressly incorporated herein by reference in its entirety.

BACKGROUND

A virtualized cluster is a cluster of different storage nodes that together expose a single storage device. Input/Output operations ("I/Os") sent to the cluster are internally re-routed to read and write data to the appropriate locations. In this regard, a virtualized cluster of storage nodes can be considered analogous to collection of disks in a Redundant Array of Inexpensive Disks ("RAID") configuration, since a virtualized cluster hides the internal details of the cluster's operation from initiators and presents a unified device instead.

In a virtualized cluster, data may also be mirrored between nodes such that copies of the data are stored in two or more locations. In a mirrored system, the data may still be available at a second node should a first node become unavailable because of hardware failure, network congestion, link failure, or otherwise. In a mirrored system, the data on each node is duplicated to other storage units. Duplication can be made at the same time as an initial write I/O or it can be done later, in a background operation. When the duplication is done at the same time as an initial write, it is called a synchronous duplication. In contrast, a later duplication performed in the background may be called an asynchronous duplication. In either synchronous or asynchronous mirroring systems, one of the main requirements of operation is to maintain the consistency of data across all of the mirror nodes. This results in predictable data retrieval irrespective of the mirrored storage node from which the data is accessed.

Data can be written to a storage node by issuing an I/O request to the node. The I/O request is issued by an initiator. The initiator may be another node, a computer, an application on a computer, or a user of a computer. When data is written to a storage node, that node may be referred to as a primary node. The primary node may then mirror the data to one or more other nodes that can be referred to as secondary nodes. Again, it is an important operational requirement that data between mirrored nodes be consistent. Because all of the data writes at each respective one of the mirrored volumes may not be instantaneous, or atomic, data inconsistencies may occur due to any one of various pathological scenarios.

One pathological scenario occurs when the primary node stores new data and then attempts to mirror the data to a secondary node, but the attempt fails. This failure may be due to a network link failure, a hardware failure at the secondary, or several other factors. Another pathological scenario occurs when the primary stores data and then mirrors the data to a secondary node but the secondary system suffers a power failure before or during the write of the new data to disk. In all of these scenarios, and other mirroring failure scenarios, the nodes may eventually come back on line with inconsistent data on mirrored nodes. This is highly undesirable since an initiator may now retrieve different data depending upon which mirrored node the request is issued.

A drive cache is generally data stored in memory that duplicates data stored on the associated disk drive. Since memory is typically much faster than a drive, the drive data is slow to fetch relative to the speed of reading the cache. In other words, a cache is a temporary, fast storage area where data can be stored for rapid access. Once data is stored in a cache, future use can be made by accessing the cache instead of accessing the slower drive data. In a write-through cache system, every write is written to both the cache and the drive. In contrast, a write-back cache system stores every write into the cache but may not immediately store the write into the drive. Instead, the write-back cache system tracks which cache memory locations have been modified by marking those cache entries as "dirty". The data in the dirty cache locations are written back to the drive when triggered at a later time. Writing back of the dirty cache entries upon such a trigger is referred to as "flushing the cache" or "flushing the cache to disk". Example triggers to flush the cache include eviction of the cache entry, shutting down the drive, or periodic cache flushing timers. A write-back cache system is also referred to as a write-behind cache system.

Additional complications to the pathological scenarios described above occur when write-back cache is used in a primary and/or secondary storage node. For example, both a primary and a secondary storage node may have received the same data to be mirrored, but the data is cached and has not yet been flushed to disk when one of the nodes suffers a power failure. In this instance, one of the data write I/Os was received but not made persistent on the disk drive. Thus, the data will be inconsistent between the two storage nodes after the power failure completes.

It is with respect to these considerations and others that the disclosure made herein is presented.

SUMMARY

Technologies are described herein for maintaining data consistency across mirrored storage nodes. Through the utilization of the technologies and concepts presented herein, data consistency may be maintained in networked storage environments using a write-intent log that first records the intent to write data before writing the data into multiple locations. Only after a delay period long enough for all of the location writes to complete, including flushing of write-back caches, is the record in the write-intent log cleared. The write-intent log can use a bitmap to flag the portions of a storage system where a write is to occur. This flagging may be provided by setting appropriate bits within the bitmap. The bitmap can be referred to as an "event gate bitmap" or simply a "gate bitmap". Moreover, technology presented herein supports processing and storage of the gate bitmaps such that data consistency may be gracefully maintained across power failures.

According to one aspect presented herein, any I/O received at a mirror node is gated prior to execution. This gating can include setting the appropriate bit within the gate bitmap and then storing the gate bitmap to disk. Flagging the gate bitmap and then storing the gate bitmap to disk ensures that the intent to perform the I/O has been stored in a non-volatile medium that will persist across a power loss. This technique can protect against inconsistencies caused by I/Os that are outstanding during a power failure at one of the nodes. A system of I/O queues may be used to set and clear the gating bits within the gate bitmap. I/O gating may only need to be performed at a primary storage node. A delay timer can be established at the primary node to also allow for all of the synchronizing writes (and cache flushes) at mirrored nodes. After a full cycle of the delay timer, the write-intent gating bit may be cleared.

Yet another aspect of write gating can protect against the loss of data consistency between the mirrored nodes caused by network link failure or power outages. A functioning mirrored node can maintain a delta list, or change list, recording the accumulated differences between data stored on that node and the data on the unreachable node. This delta may also be referred to as a "tab". The tab may be of a finer spatial granularity than the gate. The tab may be reflecting in the gating bits. For example, gating bits corresponding to tab entries may persist until node synchronization clears the tab. The tab may also be persisted to disk to protect its contents across local power failures.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
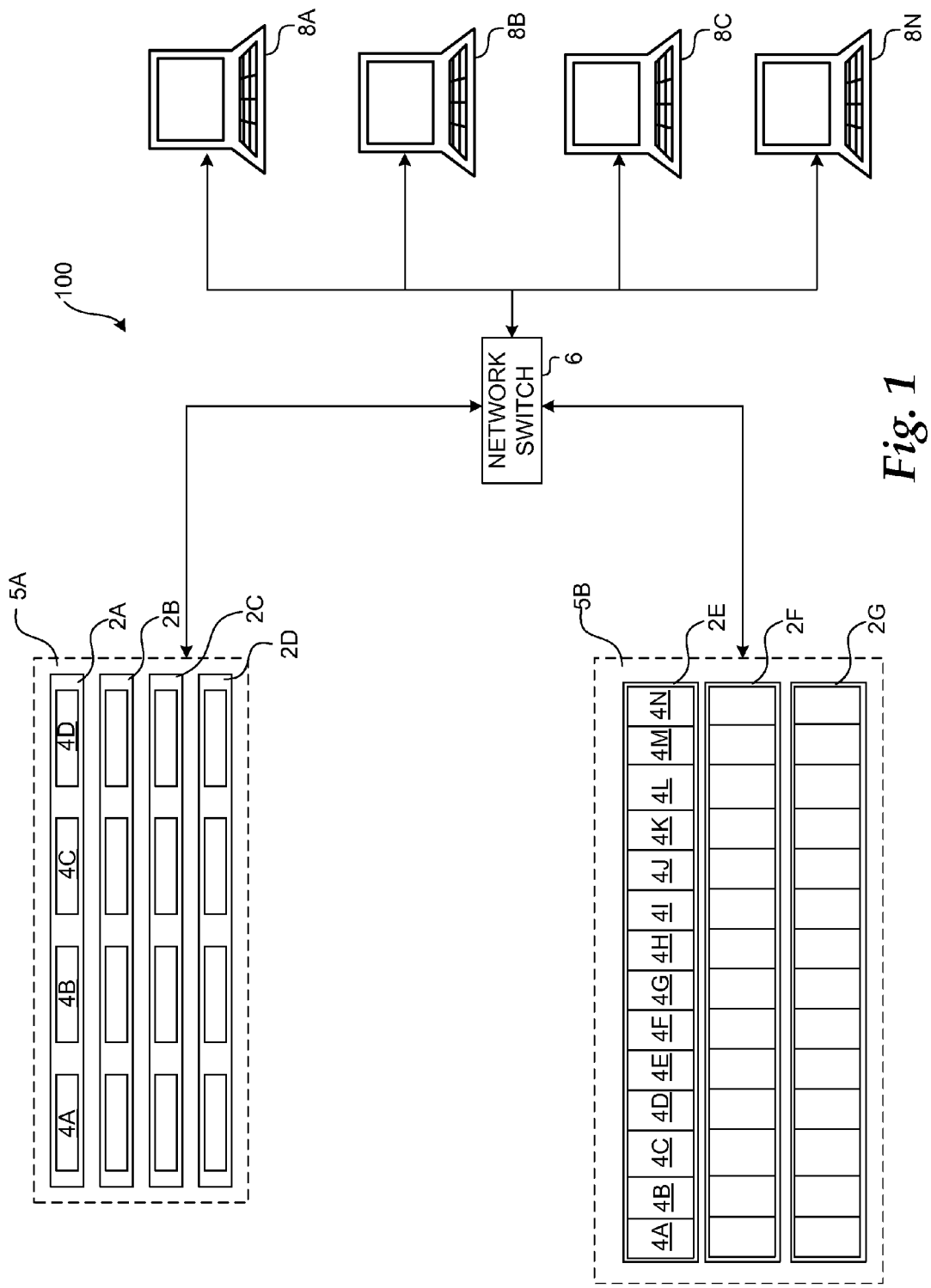
FIG. 1 is a network architecture diagram illustrating aspects of a storage system that includes several virtualized clusters according to one exemplary embodiment.

The following detailed description is directed to technologies for maintaining data consistency across mirrored storage nodes. Through the use of the embodiments presented herein, data consistency may be maintained in networked storage environments using write-intent gating that first records the intent to write data before writing the data into multiple mirrored storage nodes of a distributed storage system.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for mirrored storage data consistency using write-intent gating will be described.

Turning now to FIG. 1, details will be provided regarding an illustrative operating environment for the implementations presented herein, as well as aspects of several software components that provide the functionality described herein for mirrored storage data consistency using write-intent gating. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B include the storage server computers 2A-2G (also referred to herein as "storage nodes" or a "node") that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D. Alternatively, each node may be housed in a three rack space unit storing up to fifteen hard disk drives. For instance, the node 2E includes fourteen hard disk drives 4A-4N. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to field I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage but the processing and mapping is done completely or primarily in a single node, is called a vertically virtualized cluster.

Data may be striped across the nodes of each storage cluster. For instance, the cluster 5A may stripe data across the storage nodes 2A, 2B, 2C, and 2D. The cluster 5B may similarly stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network ("LAN") as the clusters 5A-5B or may be connected to the clusters 5A-5B via a distributed wide area network, such as the Internet. An appropriate protocol, such as the Internet Small Computer Systems Interface ("iSCSI") protocol may be utilized to enable the initiators 8A-8D to communicate with and utilize the various functions of the storage clusters 5A-5B over a wide area network such as the Internet.

Two or more disks 4 within each cluster 5A-5B or across clusters 5A-5B may be mirrored for data redundancy and protection against failure of one, or more, of the disks 4. Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Figure 2:
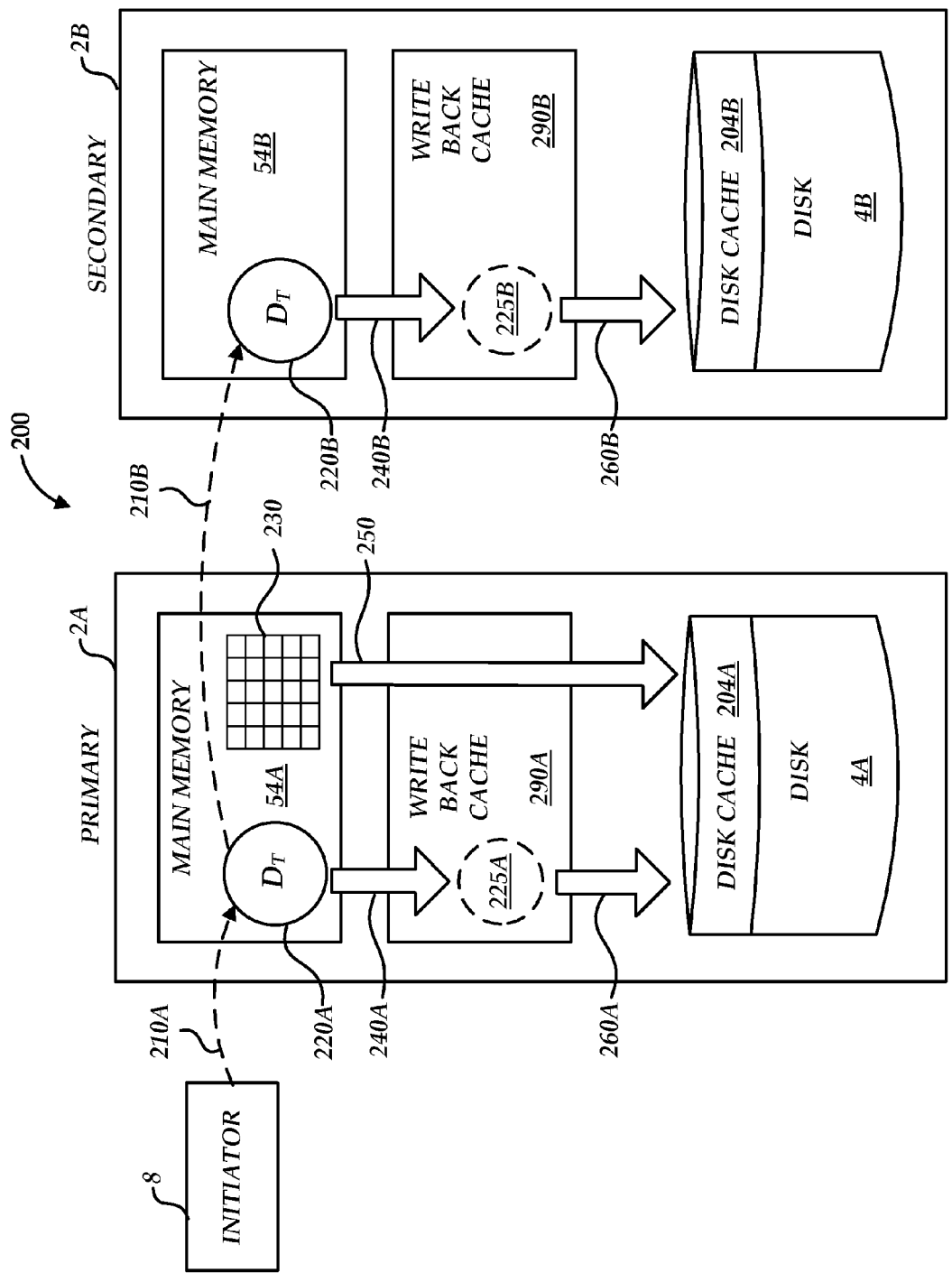
FIG. 2 is a functional architecture diagram illustrating a mirrored storage system where storage nodes employ write back cache according to one exemplary embodiment.

Referring now to FIG. 2, a mirrored storage system 200 is illustrated where the storage nodes 2A-2B employ write intent gating and write back caching according to one exemplary embodiment. A data I/O 210A from an initiator 8 is issued to a primary storage node 2A. The primary storage node 2A is mirrored with a secondary storage node 2B. A synchronizing I/O 210B can be relayed to the secondary storage node 2B from the primary storage node 2A in order to establish and maintain data mirroring. The synchronizing I/O 210B may be identical in payload to the original data I/O 210A. The data I/O 210A can request, as one I/O example, the storage of data $D_T$ 220A within the storage system 200. Upon initial receipt at the primary storage node 2A, the I/O 210A, including its associated data $D_T$ 220A may be located within the main memory 54A of the primary storage node 2A.

Gating within the primary storage node 2A can delay the performance, and mirroring, of the I/O 210A until the intent to perform the I/O 210A is recorded within the primary storage node 2A. The write intent can be recorded by flagging a bit in a gate bitmap 230. The gate bitmap 230 may initially be located within the main memory 54A of the primary storage node 2A. After flagging the write intent bit within the gate bitmap 230, the gate bitmap 230 can be written 250 to a mass storage device within the primary storage node 2A. This write 250 to a mass storage device can ensure the persistence of the write intent across a failure. The mass storage may include, as one example, a hard disk 4A.

The gate bitmap 230 can be used to represent an entire disk 4A. Initially, all of the entries in the gate bitmap 230 can be set to zero. Each particular bit within the gate bitmap 230 can be set to one as it is used. Setting a bit to one can record the intent to write within the space on the disk 4A represented by the respective bit within the gate bitmap 230. The amount of the space represented by each bit, or flag, within the gate bitmap 230 can be determined by the granularity of the gate bitmap 230. A finer granularity may imply that each bit within the gate bitmap 230 represents a smaller portion of the disk 4A. A coarser granularity may imply that each bit within the gate bitmap 230 represents a larger portion of the disk 4A. Thus, for a given size disk 4A, a finer granularity gate bitmap 230 would be larger, or have more bits, than would a coarser granularity gate bitmap 230.

Once the writing 250 of gate bitmap 230 to disk 4A is verified, the actual performance of the I/O 210A can be carried out. Also, the synchronizing I/O 210B can be released to the secondary storage node 2B. Not until a predetermined delay period expires will the intent flag within gate bitmap 230 be cleared, or set to zero. The predetermined delay period can be selected as to exceed the amount of time for completion of both the actual performance of the I/O 210A and the synchronizing I/O 210B.

The actual performance of the I/O 210A can include, in this data I/O example, the writing 240A of data $D_T$ 220A onto disk 4A. This includes the flushing 260A of the cached data 225A from the write back cache 290A to disk 4A. It also includes the flushing of any related data in the disk cache 204A to the disk 4A. The disk cache 204A may include any RAID-level caching. The synchronizing I/O 210B can initiate data storage on a secondary storage node 2B as detailed hereinafter.

Upon arrival at the secondary storage node 2B, the synchronizing I/O 210B, including its associated data $D_T$ 220B may be located within the main memory 54B of the secondary storage node 2B. Storing the data $D_T$ 220B from the main memory 54B to the disk 4B may include writing 240B cached data 225B into a write back cached memory 290B followed by flushing 260B of the cached data 225B to the disk 4B. Flushing 260B to the disk 4B may occur through a disk-level cache 204B.

While FIG. 2 illustrates an exemplary embodiment with two mirrored storage nodes 2A-2B, the storage system 200 may also mirror data between any number of storage nodes.

Also, the identification of one node as a primary storage node 2A and another node as a secondary storage node 2B may be arbitrary. The initiator 8 may process a data I/O 210A with any of the nodes in a mirrored set making that node the primary node 2A in that instance. That primary node 2A may then issue synchronizing I/O requests 210B with the other nodes in the mirrored set.

Figure 3:
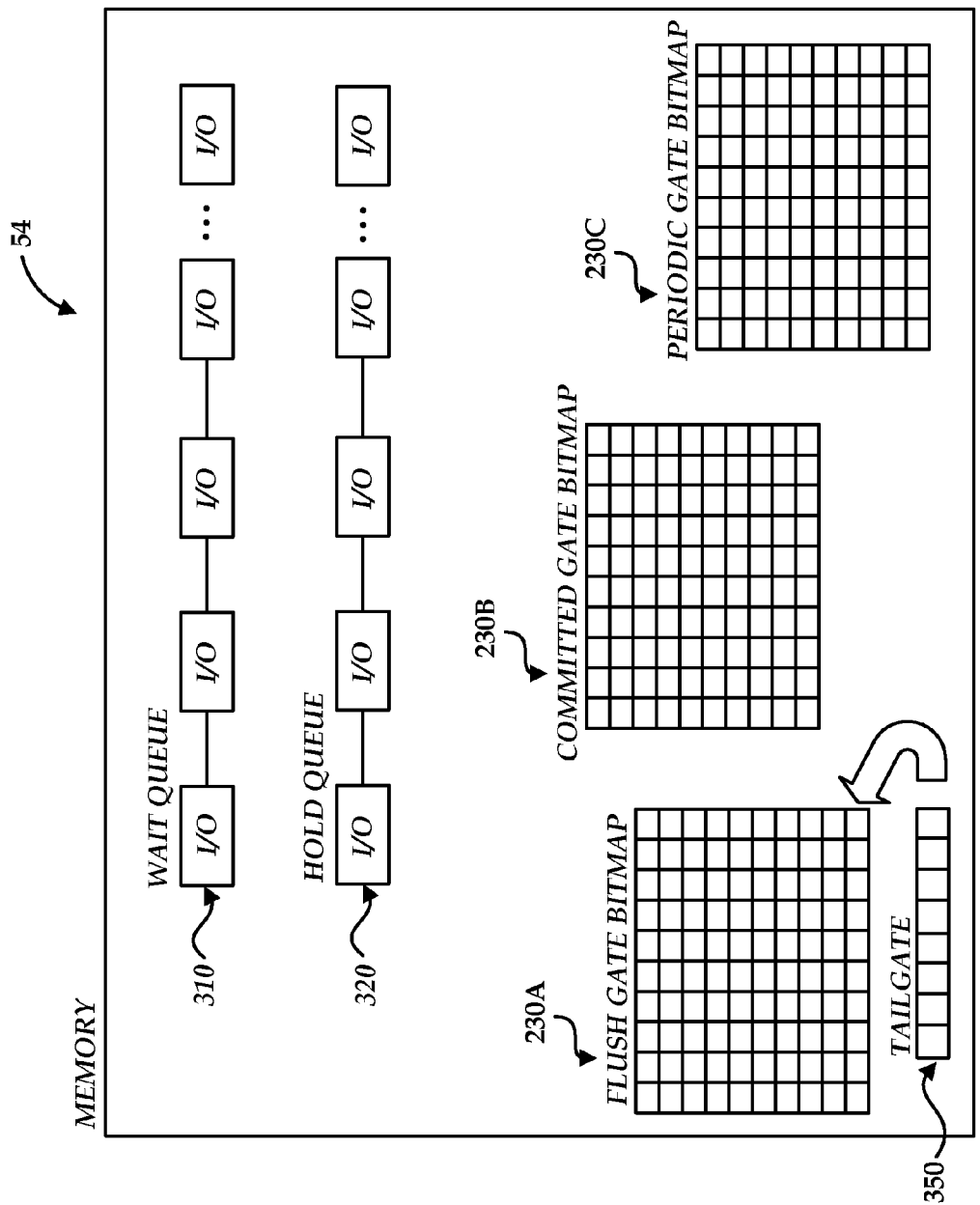
FIG. 3 is a data structure diagram illustrating elements used in write gating with write back cache according to one exemplary embodiment.

Referring now to FIG. 3, data structures used in write gating are illustrated according to one exemplary embodiment. Three gate bitmaps 230A-C can be used to represent an entire disk 4. Initially, all of the entries in the flush gate bitmap 230A can be set to zero. Each particular bit within the flush gate bitmap 230A can be set to one as it is used to record an intent to write within the space on the disk 4 represented by the respective bit within the flush gate bitmap 230A.

In addition to the flush gate bitmap 230A, a committed gate bitmap 230B may be kept in memory as a working copy of the gate bitmap 230 that has been committed to disk 4. Whenever the flush gate bitmap 230A is stored to disk, the flush gate bitmap 230A can be copied to the committed gate bitmap 230B.

Also, a periodic gate bitmap 230C may be provided for use in the periodic clearing of the flush gate bitmap 230A. Any bit written to the flush gate bitmap 230A may also be written to the periodic gate bitmap 230C. After each gate clearing delay period, the periodic gate bitmap 230C may be copied over the flush gate bitmap 230A and then the periodic gate bitmap 230C can be cleared. Copying the periodic gate bitmap 230C over the flush gate bitmap 230A can cause bit entries that were cleared in the periodic gate bitmap 230C at the prior delay period to be cleared from the flush gate bitmap 230A at the current period. This mechanism can allow bits set within the flush gate bitmap 230A to remain set for at least one delay period and then to be cleared as appropriate.

The gate bitmaps 230A-C can be sized relative to some physical or logical parameter of the disk 4 so as to leverage efficiency in frequent writes of the flush gate bitmap 230A to the disk 4. For example, the gate bitmaps 230A-C can be sized to fit within one RAID stripe of the disk 4. A given disk 4 may use more than one gate bitmap 230 if, as an example, the desired size of the gate bitmap 230 spans two RAID stripes, or other efficient portion of the disk 4. In such a case, two gate bitmaps 230 can be established each covering half, or some other division, of the disk 4 and the two gate bitmaps 230 can be stored to disk 4 independently as needed.

The amount of the space represented by each bit, or flag, within the gate bitmap 230 can be determined by the granularity of the gate bitmap 230. A finer granularity may imply that each bit within the gate bitmap 230 represents a smaller portion of the disk 4. A coarser granularity may imply that each bit within the gate bitmap 230 represents a larger portion of the disk 4. Thus, for a given size disk 4, a finer granularity gate bitmap 230 would be larger, or have more bits, than would a coarser granularity gate bitmap 230. Selecting the appropriate granularity of the gate bitmap 230 can be a tradeoff between selecting a fine granularity that can reduce the amount of disk 4 space associated with each gate bit, and a coarse granularity that can reduce the number of times that the gate bitmap 230 will need to be flushed to disk 4. Considering one example, each bit in the gate bitmap 230 can account for 8 MB of data on the disk 4. In this case, outstanding I/Os and cached data falling in the same 8 MB region are logged as a single entry (or bit, or flag) in the gate bitmap 230. After the first I/O causes the proper bit within the gate bitmap 230 to be flagged, subsequent I/Os can be processed without modifying and storing the gate bitmap 230.

The choice of the gate granularity can be influenced by several additional factors including write latency of the disk 4, locality of reference, and link delay. With respect to write latency of the disk 4, fine granularities for the gate bitmap 230 may result in almost every I/O 210 having to wait for a gate flush 250 to complete before the I/O 210 can be performed. This can drastically impact application I/O write time and is not desirable. With respect to locality of reference, application writes can be statistically localized temporally and spatially. For example, there can be a burst of I/Os to small areas of the disk 4 over a short period of time. Furthermore, certain types of data, such as logs, media files, or databases may be accessed sequentially. Thus, coarser granularity of the gate bitmap 230 can ensure that more outstanding I/Os hit the same gate region and thus do not need to wait for a gate bitmap flush 250 prior to performing the I/O 210. With respect to link delay, a coarse granularity of the gate bitmap 230 can require more data to be synchronized between the mirrored nodes thereby increasing resynchronization times and network usage. Balancing between these factors, as well as considering the relationship between gate bitmap 230 size and RAID stripe size as discussed previously, can provide a framework for selecting a gate bitmap 230 granularity that best suits a particular storage system 200.

A vector of bits at the end of the gate bitmap 230 can be used for additional control and configuration metadata. This vector of bits may be referred to as the tailgate 350. The tailgate 350 may be within the gate bitmap 230. One or more bits in the tailgate 350 may be used to indicate the granularity of the gate bitmap 230. The granularities could be coded as, for example, 2 MB, 4 MB, 8 MB, or 16 MB for each gate bit. The granularity of the gate bitmap 230 may be dynamically increased or decreased during run-time. The tailgate 350 does not need to be stored in local memory 54 along with the rest of the gate bitmap 230. The tailgate 350 can be updated into the end of the gate bitmap 230 right before, or while, the gate bitmap 230 is being written to disk 4.

The gate bitmap 230 may be double buffered on disk 4. That is, successive writes of the gate bitmap 230 to disk 4 may alternate between two distinct areas on the disk 4. This technique ensures that an entire gate bitmap 230 image is always available on the disk. If power was lost in the middle of writing a gate bitmap 230 image to disk 4, the immediately prior stored gate bitmap 230 image may still be available in the alternate location on the disk 4.

The tailgate 350 can also contain a sequence number used to identify the latest gate bitmap 230 on the disk 4. Since the sequence number can be stored in the tailgate 350 and the tailgate 350 can be at the end of the gate bitmap 230, the sequence number may be written to the disk 4 after the write of the entire gate bitmap 230 is successful. Thus, the existence of a higher sequence number in a gate bitmap 230 image stored on a disk 4 can indicate that the stored gate bitmap 230 is the latest one stored to disk and that it is an entire gate bitmap 230 image. When a storage node 2 powers up, both gate bitmap 230 storage locations on the disk 4 can be examined. The gate bitmap 230 image on the disk 4 with the highest sequence number can then be loaded into local memory 54 for use. The process of selecting the highest sequence number can adjust for the wrapping of the sequence number counter at its high limit.

The gate bitmap 230 can be split to represents multiple separate gates related to multiple secondary nodes 2. For example, if one node 2A is mirrored with two separate nodes 2B, the space for the gate bitmap 230 may be split into two separate gate bitmaps 230 where a first split is related to a first mirrored node 2A and a second slit is related to a second mirrored node 2B. These independent gate bitmaps 230 may allow synchronizing I/Os to each of the mirrored nodes to be gated independently at the primary node.

Each gate bit in the gate bitmap 230 may have two I/O queues associated with it. The two I/O queues are the wait queue 310 and the hold queue 320. Each of the two queues 310, 320 may be implemented as linked lists, double linked lists, arrays, arrays of structures, FIFO buffers, or any other data structure or mechanism to store I/O requests. The wait queue 310 temporarily queues I/O requests 210 prior to the corresponding gate bit being set in the gate bitmap 230. Once the corresponding gate bitmap 230 entry is made, the I/O may be moved to the hold queue 320. The I/O can remain in the hold queue 320 until the gate bitmap 230 is stored, and flushed, to the disk 4. After the updated gate bitmap 230 is stored, and flushed, to the disk 4, the I/O can be removed to the hold queue 320 and the I/O request 210 can be performed. Additional details regarding the I/O queues 310, 320 will be presented below with respect to FIGS. 4-7.

Figure 4:
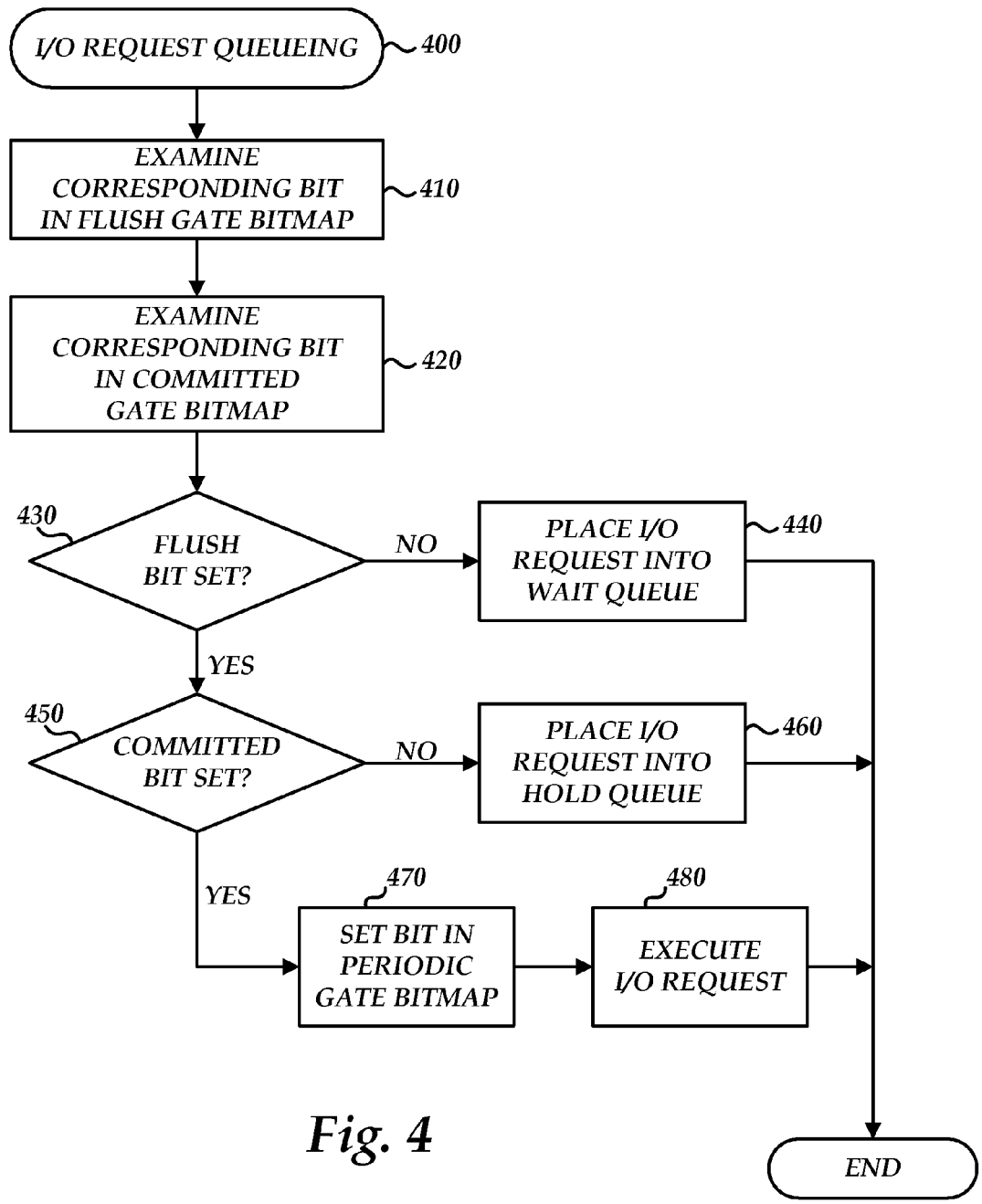
FIG. 4 is a logical flow diagram illustrating a process performed by a mirrored storage node for I/O request queuing according to one exemplary embodiment.

Turning now to FIG. 4, additional details will be provided regarding the embodiments presented herein for write intent gating in systems with write-back cache. In particular, FIG. 4 is a flow diagram showing a routine 400 that illustrates aspects of an exemplary process performed by a mirrored storage node 2 for I/O request queuing. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 400 can begin with operation 410 where a bit in the flush gate bitmap 230A corresponding to the I/O request 210 being queued is examined. In operation 420, a bit in the committed gate bitmap 230B corresponding to the I/O request 210 being queued is examined. The state of the two bits examined in operation 410 and operation 420 determines how to queue the I/O request 210.

At operation 430, the bit from the flush gate bitmap 230A discussed in operation 410 is evaluated. If the flush bit is not set, then the area on the disk 4 corresponding to that gate bit is not flagged. Thus the routine 400 transitions to operation 440 where the I/O request 210 is placed into the wait queue 310. After operation 440, the routine 400 may terminate.

If however, the flush bit evaluated in operation 430 is set, then the routine 400 can transition to operation 450 to evaluate the committed bit from the committed gate bitmap 230B discussed in operation 420. If the committed bit is not set, then the flush gate bitmap 230A has not been stored to disk 4 yet and the routine 400 can transition to operation 460 where the I/O request 210 is placed into the hold queue 320 to wait for the storing of the flush gate bitmap 230A to complete. The routine 400 can terminate after operation 460.

If the committed bit, as evaluated at operation 450, is set then the corresponding area on the disk 2 has been flagged in the flush gate bitmap 230A and the flush gate bitmap 230A has been committed to disk. Thus is it safe to execute the I/O request 210. The routine 400 proceeds to operation 470 where the corresponding bit in the periodic gate bitmap 230C is set to force the gating to remain in effect for at least one more delay period. This can provide enough time to execute the I/O 210 request including any time to flush write-back caches. Next, at operation 480, the I/O request 210 is executed. The routine 400 can terminate after operation 480.

Figure 5:
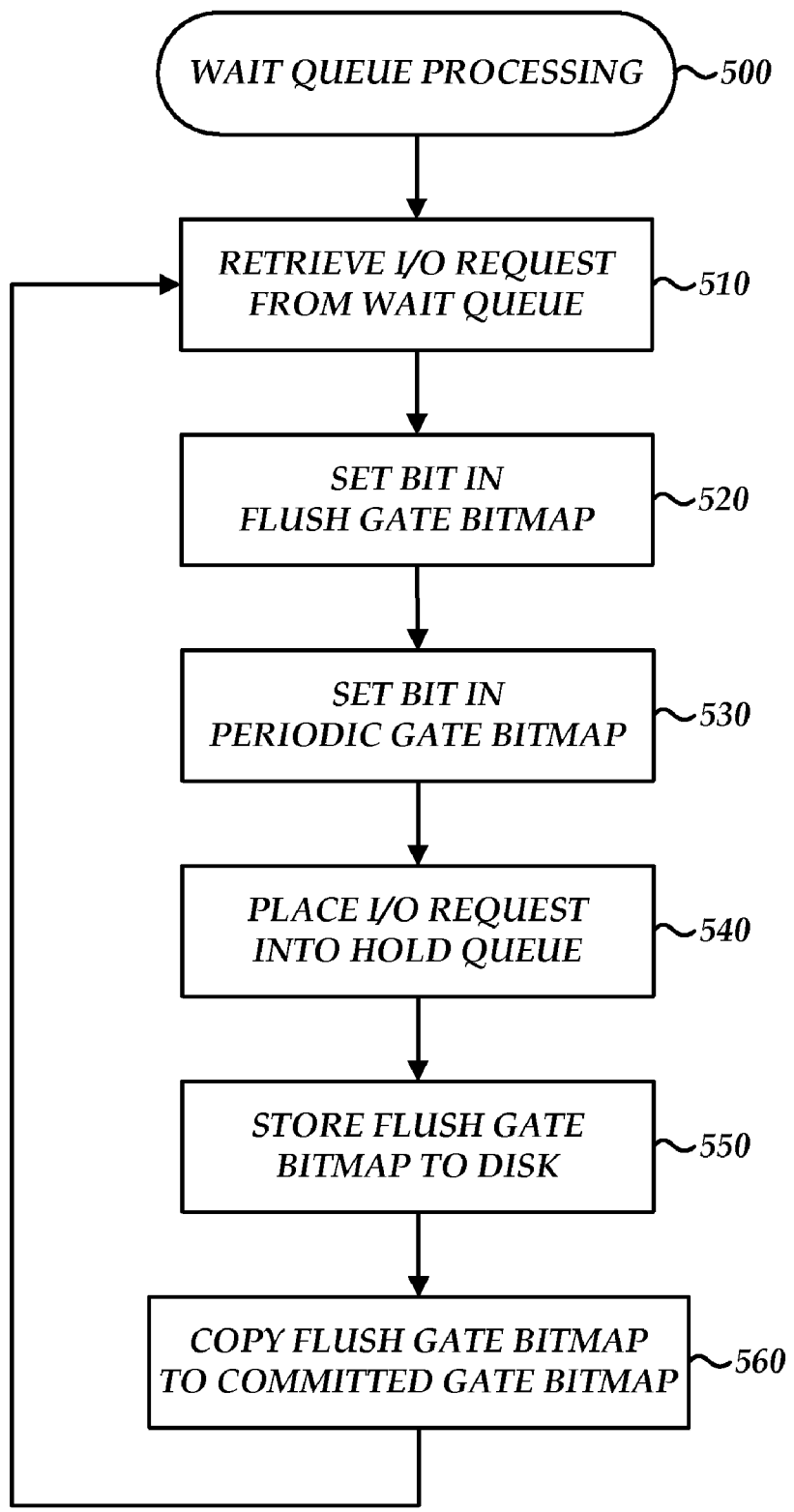
FIG. 5 is a logical flow diagram illustrating a process performed by a mirrored storage node for wait queue processing according to one exemplary embodiment.

Turning now to FIG. 5, additional details will be provided regarding the embodiments presented herein for write intent gating on systems with write-back cache. In particular, FIG. 5 is a flow diagram illustrating a routine 500 that shows aspects of an exemplary process performed by a mirrored storage node 2 for wait queue processing.

The routine 500 can begin with operation 510 where an I/O request 210 may be retrieved from the wait queue 310. The wait queue 310 is used to hold I/O requests 210 until they are properly gated. At operation 520, a bit is set in the flush gate bitmap 230A corresponding to a region on the disk 4 related to the I/O request 210. Setting this bit makes a record of the intent to perform an I/O request 210 within the corresponding region of the disk 4. At operation 530, a bit is set in the periodic gate bitmap 230C corresponding to a region on the disk 4 related to the I/O request 210. Setting this bit forces the intent gating to remain in place for at least one delay period. This allows enough time for the gated I/O operations to complete as well as time for any writes to write back cache to be flushed to disk.

At operation 540, the I/O request 210 is placed into the hold queue 320. The hold queue 320 stores I/O requests 210 that have been gated until the gating bitmap 230 is committed to the disk 4. At operation 550, the flush gate bitmap 230A is stored to disk 4. Storing the flush gate bitmap 230A to disk ensures that the intent gating is persisted across power failures. After the flush gate bitmap 230A is stored to disk, the routine 500 proceeds to operation 560 where the flush gate bitmap 230A is copied to the committed gate bitmap 230B as a working copy of the gate bitmap 230 that has been committed to disk 4.

Figure 6:
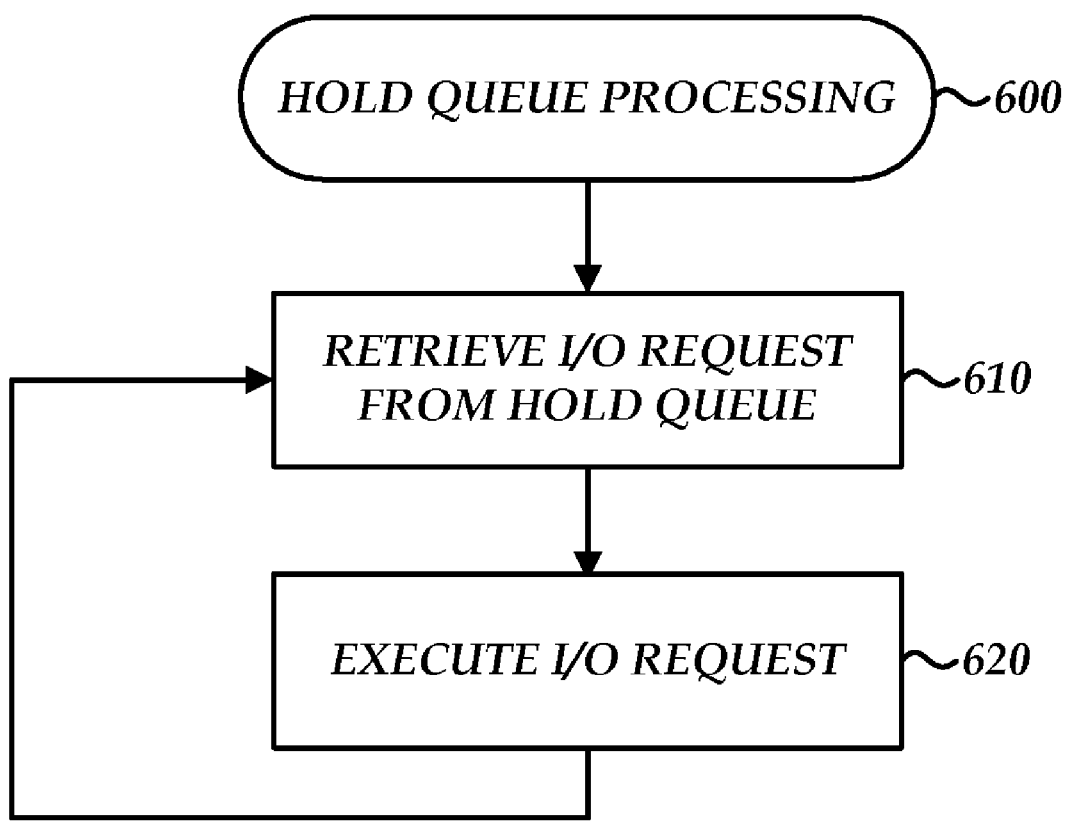
FIG. 6 is a logical flow diagram illustrating a process performed by a mirrored storage node for hold queue processing according to one exemplary embodiment.

Turning now to FIG. 6, additional details will be provided regarding the embodiments presented herein for write intent gating on systems with write-back cache. In particular, FIG. 6 is a flow diagram illustrating a routine 600 that shows aspects of an exemplary process performed by a mirrored storage node 2 for hold queue processing.

The routine 600 can begin with operation 610 where an I/O request 210 may be retrieved from the hold queue 320. The hold queue 320 is used to hold I/O requests 210 until the associated gate bitmap 230 has been stored to the disk 4. At operation 620, the I/O request 210 that was retrieved in operation 610 is executed. After operation 620, the routine 600 returns to operation 610 to processes further I/O requests 210.

Figure 7:
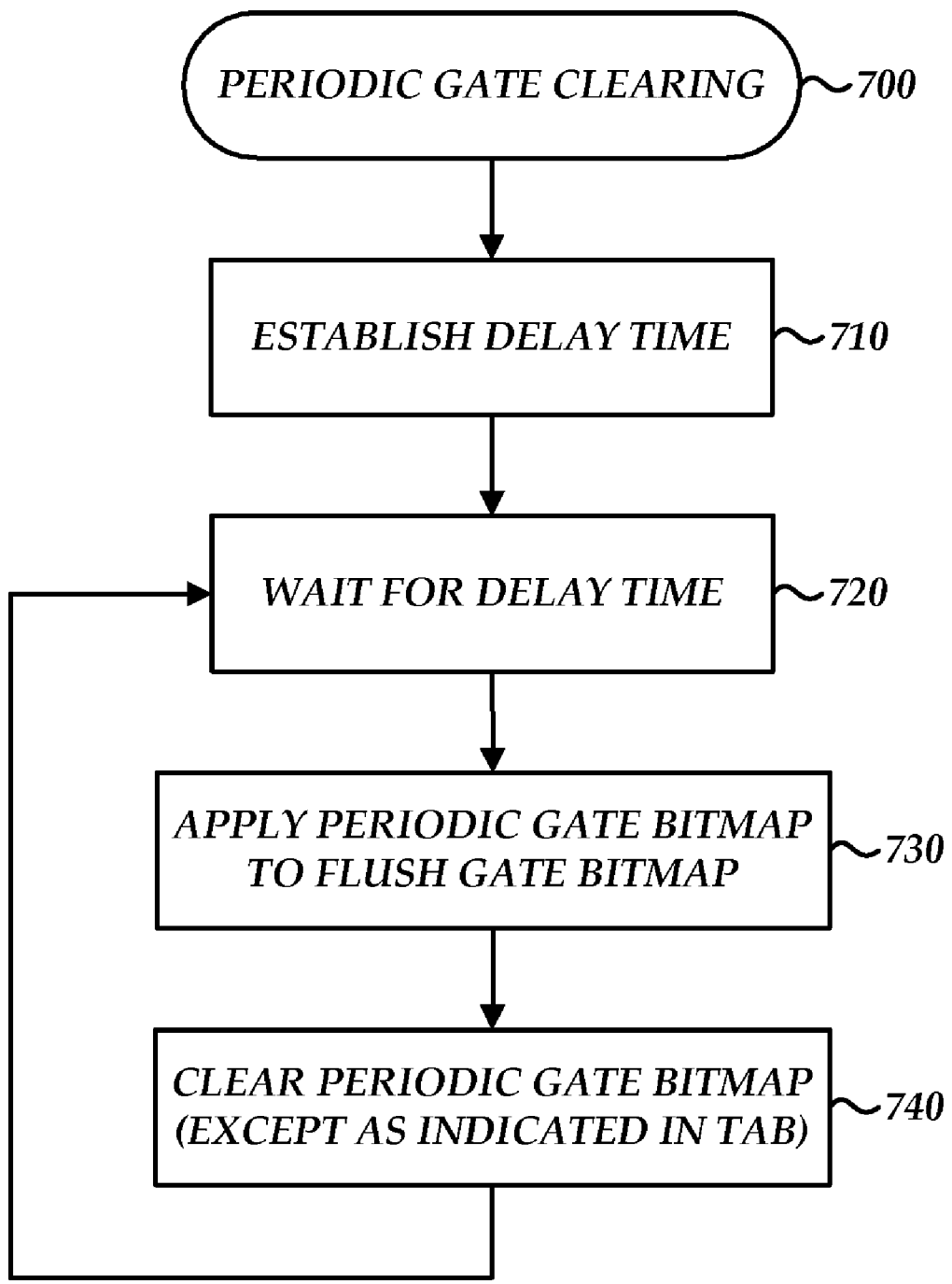
FIG. 7 is a logical flow diagram illustrating a process performed by a mirrored storage node for periodic gate flushing according to one exemplary embodiment.

Turning now to FIG. 7, additional details will be provided regarding the embodiments presented herein for write intent gating on systems with write-back cache. In particular, FIG. 7 is a flow diagram illustrating a routine 700 that shows aspects of an exemplary process performed by a mirrored storage node 2 for periodic gate clearing.

The routine 700 can begin with operation 710 where a delay time, or delay period, is established. This delay time can be long enough so that any write-back cache entries made before the period began will have been flushed to disk 4 by the end of the period. This maximum cache flush time can be set manually or derived from operational parameters of the memories, disk drives 4, and storage sub-systems within the storage node 2.

At operation 720, the routine 700 waits for the duration of the delay time or for one delay period. This waiting can be done using counters, timers, interrupts, real-time clocks, or other similar electronic time-keeping mechanisms. After the delay period completes, the routine 700 proceeds to operation 730 where the periodic gate bitmap 230C is applied to the flush gate bitmap 230A. The periodic gate bitmap 230C can be copied over the flush gate bitmap 230A causing bit entries that were cleared in the periodic gate bitmap 230C at the prior delay period to be cleared from the flush gate bitmap 230A at this period. This mechanism can allow bits set within the flush gate bitmap 230A to remain set for at least one delay period and then to be cleared as appropriate.

At operation 740, the periodic gate bitmap 230C can be cleared. Clearing the periodic gate bitmap 230C just after it is copied to the flush gate bitmap 230A allows bits (that are not re-set by use) to be cleared from the flush gate bitmap 230A. This clearing will occur in the next iteration of operation 730 when the (now cleared) periodic gate bitmap 230C is copied to the flush gate bitmap 230A. When clearing the periodic gate bitmap 230C, bits corresponding to entries in the tab are not cleared. Entries in the tab represent mirror I/O requests 210B issued to other mirrored storage nodes 2B that have not completed yet due to link failure, system failure, or any other reason. By keeping tab entries flagged in the flush gate bitmap 230A instead of clearing them, the storage node 2 can maintain an indicator that mirroring synchronization remains incomplete. After operation 740, the routine 700 can return to operation 720 to begin the next delay period cycle.

Figure 8:
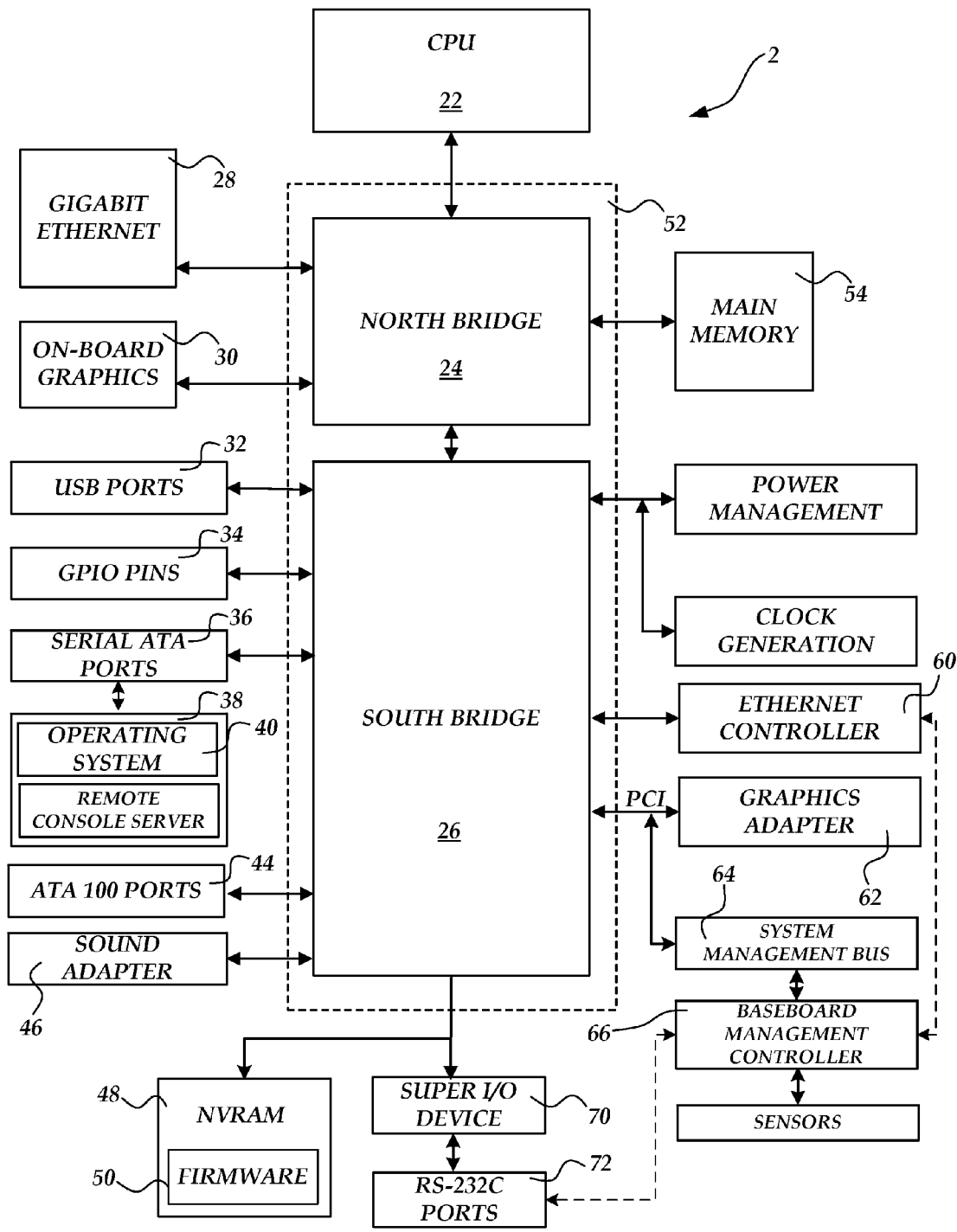
FIG. 8 is a computer architecture diagram illustrating a computer hardware architecture for a computing system capable of serving as a storage node according to one exemplary embodiment of the present invention.

FIG. 8 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

In particular, FIG. 8 shows an illustrative computer architecture for a storage node computer 2 that may be utilized in the implementations described herein. The storage node computer 2 includes a baseboard, or "motherboard", which is a printed circuit board to which a multitude of components or devices may be connected by way of a system bus or other electrical communication paths. In one illustrative embodiment, a CPU 22 operates in conjunction with a chipset 52. The CPU 22 is a standard central processor that performs arithmetic and logical operations necessary for the operation of the computer. The storage node computer 2 may include a multitude of CPUs 22.

The chipset 52 includes a north bridge 24 and a south bridge 26. The north bridge 24 provides an interface between the CPU 22 and the remainder of the computer 2. The north bridge 24 also provides an interface to a random access memory ("RAM") used as the main memory 54 in the computer 2 and, possibly, to an on-board graphics adapter 30. The north bridge 24 may also include functionality for providing networking functionality through a gigabit Ethernet adapter 28. The gigabit Ethernet adapter 28 is capable of connecting the computer 2 to another computer via a network. Connections which may be made by the network adapter 28 may include LAN or WAN connections. LAN and WAN networking environments are commonplace in offices, enterprise-wide computer networks, intranets, and the internet. The north bridge 24 is connected to the south bridge 26.

The south bridge 26 is responsible for controlling many of the input/output functions of the computer 2. In particular, the south bridge 26 may provide one or more universal serial bus ("USB") ports 32, a sound adapter 46, an Ethernet controller 60, and one or more general purpose input/output ("GPIO") pins 34. The south bridge 26 may also provide a bus for interfacing peripheral card devices such as a graphics adapter 62. In one embodiment, the bus comprises a peripheral component interconnect ("PCI") bus. The south bridge 26 may also provide a system management bus 64 for use in managing the various components of the computer 2. Additional details regarding the operation of the system management bus 64 and its connected components are provided below.

The south bridge 26 is also operative to provide one or more interfaces for connecting mass storage devices to the computer 2. For instance, according to an embodiment, the south bridge 26 includes a serial advanced technology attachment ("SATA") adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs, such as the SATA disk drive 38. As known to those skilled in the art, an operating system 40 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 40 comprises the LINUX operating system. According to another embodiment of the invention the operating system 40 comprises the WINDOWS SERVER operating system from MICROSOFT CORPORATION. According to another embodiment, the operating system 40 comprises the UNIX or SOLARIS operating system. It should be appreciated that other operating systems may also be utilized.

The mass storage devices connected to the south bridge 26, and their associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 6 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 2 and to transfer information between elements within the computer 2.

As described briefly above, the south bridge 26 may include a system management bus 64. The system management bus 64 may include a BMC 66. In general, the BMC 66 is a microcontroller that monitors operation of the computer system 2. In a more specific embodiment, the BMC 66 monitors health-related aspects associated with the computer system 2, such as, but not limited to, the temperature of one or more components of the computer system 2, speed of rotational components (e.g., spindle motor, CPU Fan, etc.) within the system, the voltage across or applied to one or more components within the system 2, and the available or used capacity of memory devices within the system 2. To accomplish these monitoring functions, the BMC 66 is communicatively connected to one or more components by way of the management bus 64. In an embodiment, these components include sensor devices for measuring various operating and performance-related parameters within the computer system 2. The sensor devices may be either hardware or software based components configured or programmed to measure or detect one or more of the various operating and performance-related parameters. The BMC 66 functions as the master on the management bus 64 in most circumstances, but may also function as either a master or a slave in other circumstances. Each of the various components communicatively connected to the BMC 66 by way of the management bus 64 is addressed using a slave address. The management bus 64 is used by the BMC 66 to request and/or receive various operating and performance-related parameters from one or more components, which are also communicatively connected to the management bus 64.

It should be appreciated that the computer 2 may comprise other types of computing devices, including hand-held computers, embedded computer systems, personal digital assistants, and other types of computing devices known to those skilled in the art. It is also contemplated that the computer 2 may not include all of the components shown in FIG. 8, may include other components that are not explicitly shown in FIG. 8, or may utilize an architecture completely different than that shown in FIG. 8.

Based on the foregoing, it should be appreciated that technologies for mirrored disk data consistency using write-intent gating in systems with write back caches are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for maintaining mirrored data consistency between a primary networked storage node and a secondary networked storage node using write-intent logging, the method comprising:
    establishing a delay period;
    logging, on the primary networked storage node, an intent to write data, comprising setting a bit in a gate bitmap, the bit corresponding to a storage area within the primary networked storage node where the data is to be written;
    writing the data to the primary networked storage node after logging the intent to write data;
    relaying a request to the secondary networked storage node to minor the data after logging the intent to write data; and
    after the delay period completes, clearing the bit in the gate bitmap to protect an underlying write-back cache, wherein any entries of the write-back cache made before the delay period began are flushed to a disk prior to the delay period completing.

2. The method of claim 1, wherein logging further comprises storing the gate bitmap to the disk.

3. The method of claim 1, wherein the delay period is longer than a specified time for the underlying write-back cache to flush.

4. The method of claim 1, wherein the delay period is longer than a specified time for relaying the request to the secondary networked storage node.

5. The method of claim 1, further comprising providing a delta tab in the primary networked storage node to temporarily store a difference between data on the primary networked storage node and data on the secondary networked storage node.

6. A computer storage medium having computer-executable instructions stored thereon which, when executed by a computer system, cause the computer system to:
    establish a delay period;
    receive an input/output (I/O) request;
    record the I/O request in a log comprising a gate bitmap, bits of the gate bitmap corresponding to respective storage areas of a disk;
    store the log to the disk;
    execute the I/O request after the log has been stored to disk;
    relay the I/O request to a mirrored computer system for execution;
    wait for the delay period to complete; and
    clear the log after the wait by clearing the bits of the gate bitmap to protect an underlying write-back cache, wherein any entries of the write-back cache made before the delay period began are flushed prior to the delay period completing.

7. The computer storage medium of claim 6, wherein the delay period is longer than a specified time for flushing the underlying write-back cache.

8. The computer storage medium of claim 6, wherein the delay period is longer than a specified time for relaying the I/O request to the mirrored computer system.

9. The computer storage medium of claim 6, wherein storing the log to the disk comprises flushing a disk cache.

10. The computer storage medium of claim 6, further comprising providing a delta tab to temporarily accumulate differences between data on the computer system and data on the mirrored computer system.

11. The computer storage medium of claim 6, wherein relaying the I/O request to the mirrored computer system comprises logging the I/O request in a delta tab until the relayed I/O request is completed.

12. The computer storage medium of claim 10, wherein clearing the log excludes clearing entries pending in the delta tab.

13. A method for maintaining mirrored data consistency between a primary networked storage node and a secondary networked storage node using write-intent logging, the method comprising:
- establishing a delay period;
- receiving an input/output (I/O) request at the primary networked storage node, comprising:
  - evaluating a log entry within a flush gate bitmap associated with an area of a disk targeted by the I/O request;
  - evaluating a log entry within a committed gate bitmap associated with an area of the disk targeted by the I/O request;
  - placing the I/O request into a wait queue if the log entry within the flush gate bitmap is not set;
  - placing the I/O request into a hold queue if the log entry within the flush gate bitmap is set and the log entry within the committed gate bitmap is not set;
  - executing the I/O request if the log entry within the flush gate bitmap is set and the log entry within the committed gate bitmap is set; and
- processing the wait queue and the hold queue;
- logging the I/O request to a log at the primary networked storage node;
- storing the log to a disk associated with the primary networked storage node;
- executing the I/O request at the primary networked storage node;
- relaying the I/O request to the secondary networked storage node for execution;
- waiting for the established delay period; and
- clearing the log after waiting.

14. The method of claim 13, wherein the log comprises a gate bitmap, bits of the gate bitmap corresponding to respective storage areas of the disk.

15. The method of claim 13, wherein processing the wait queue and the hold queue comprises:
- retrieving the I/O request from the wait queue;
- setting the log entry associated with an area of the disk targeted by the I/O request retrieved from the wait queue; and
- placing the I/O request retrieved from the wait queue into the hold queue after setting the log entry.

16. The method of claim 13, wherein processing the wait queue and the hold queue comprises retrieving the I/O request from the hold queue prior to executing the I/O request at the primary networked storage node.

* * * * *